United States Patent [19]

Levati

[11] 4,315,039
[45] Feb. 9, 1982

[54] PROCESS FOR PEELING TOMATOES UNDER VACUUM

[75] Inventor: Renzo Levati, Collecchio, Italy

[73] Assignee: R. Levati S.p.A., Parma, Italy

[21] Appl. No.: 755,055

[22] Filed: Dec. 28, 1976

[30] Foreign Application Priority Data

Jan. 23, 1976 [IT] Italy .............................. 46810 A/76

[51] Int. Cl.³ ...................... A23L 1/212; A23N 7/00
[52] U.S. Cl. .................................... 426/482; 99/472; 99/584; 426/509
[58] Field of Search ............... 426/482, 287, 481, 286, 426/404, 486, 509, 510; 99/472, 473, 584, 483, 516, 536

[56] References Cited

U.S. PATENT DOCUMENTS

1,173,230 2/1916 Vaudrenil ....................... 99/584 X
1,910,749 5/1933 Chapman ........................... 426/482
3,769,439 10/1973 Kafejiev et al. .................. 99/472 X
4,026,203 5/1977 Levati .................................. 99/472

FOREIGN PATENT DOCUMENTS

2060447 6/1971 Fed. Rep. of Germany ...... 426/482

Primary Examiner—Kenneth M. Schor
Attorney, Agent, or Firm—Brisebois & Kruger

[57] ABSTRACT

Improved process for peeling tomatoes under vacuum comprises the step of instantaneously connecting the container of the tomatoes to a vacuum vessel and, immediately after, the step of closing this connection and connecting the said container to a vacuum pump. The vacuum applied to the tomatoes is fluctuated downwardly for peeling the tomatoes. Also, disclosed is a machine for peeling tomatoes which comprises flexibles pipes connecting the containers of the tomatoes to a vacuum vessel and/or a vacuum pump via a dehumidifier.

2 Claims, 2 Drawing Figures

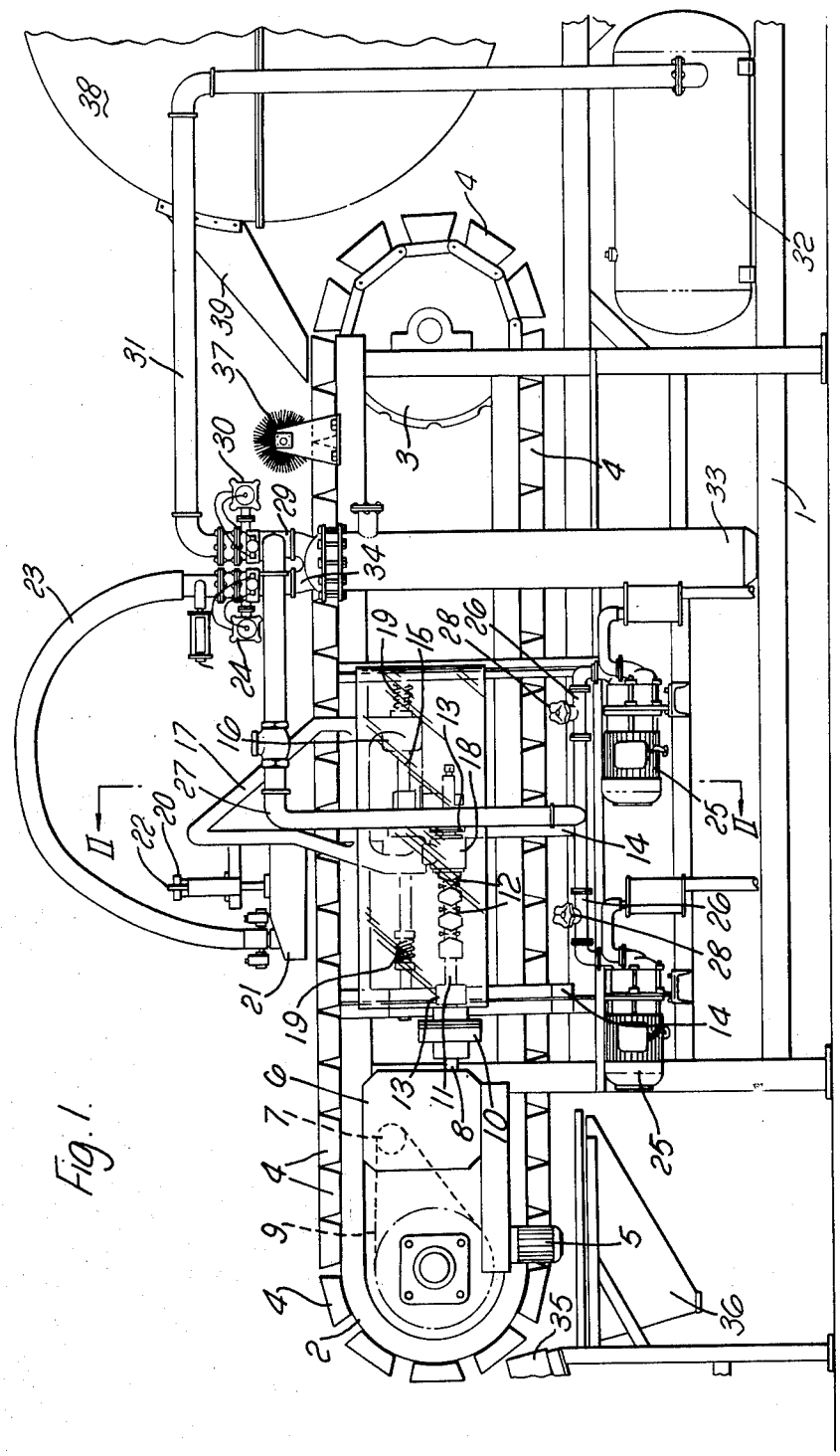

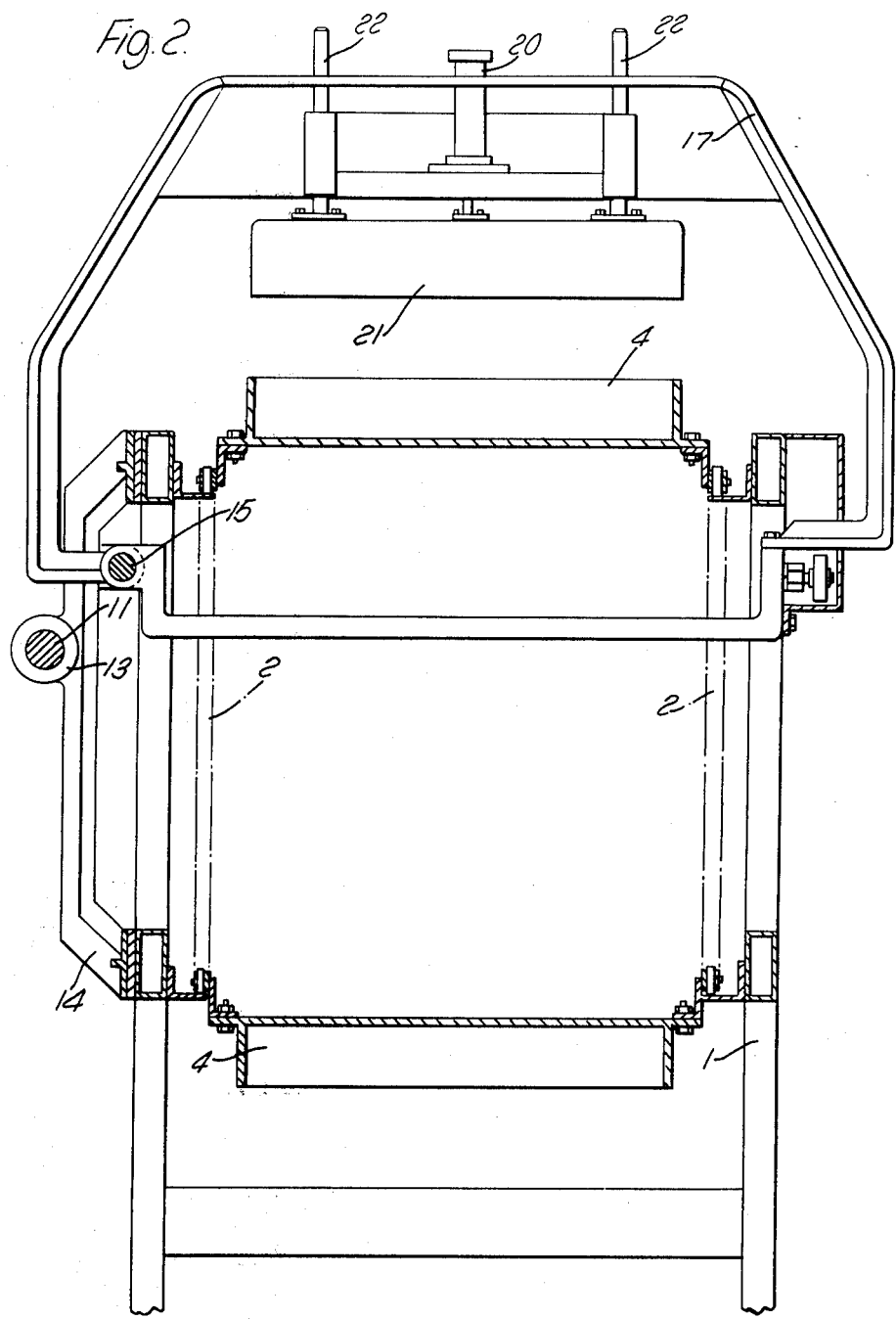

PROCESS FOR PEELING TOMATOES UNDER VACUUM

Processes and machines are known for peeling tomatoes under vacuum, and are used in the preserving industry for producing canned peeled tomatoes.

In the known art, the tomatoes are placed under vacuum for a few moments after undergoing previous "scalding" which cooks the skin without altering the underlying sugary layers.

This vacuum causes the fruit to expand with consequent rupture of the skin which, in contrast to the pulp, is not expandable.

Machines are commercially available for peeling tomatoes in accordance with this method.

For example, a machine is known consisting of a set of neighbouring trays supported by two suitable chains driven by two suitable pairs of sprocket wheels.

The tomatoes fall into said trays from the scalder, and then fall into the skin separation machine disposed downstream.

As they move in a straight line above the machine, the trays full of tomatoes are covered, in groups of two or three, by a suitable cap. This cap rests on a group of trays and follows them for a distance which is substantially one half of the distance between the centres of the covered group of trays and the next group.

Said cap is provided with suitable seal means which rest on the edges defined by the covered group of trays, and is connected by a flexible pipe to a convenient vacuum pump which puts the chamber defined by the trays and covering cap under vacuum.

This vacuum causes the fruit pulp to expand and rupture the non-expandable skin.

A machine of the aforementioned type is described in Italian patent application No. 46891 A/73 in the name of the present applicant, and corresponds to U.S. Application Ser. No. 522,644, now issued as U.S. Pat. No. 4,026,203.

However, known machines as designated present a series of disadvantages, the first of which is the incomplete rupture of the skins, for example in the case of those tomatoes which are not completely ripe. Said difficulty derives mainly from the fact that known machines are not able to attain a sufficient degree of vacuum in a sufficiently short time.

Moreover, it has been surprisingly found that rupturing the tomato skin does not depend only on the degree of vacuum attained, but also on the speed with which this degree of vacuum is obtained and how the stress due to the vacuum acts on the fruit. It has in fact been found that for any given maximum vacuum, the effect is greatly improved if this vacuum is attained not "linearly" but with one or more fluctuations.

These pressure fluctuations induce expansion and contraction "pulsations" in the fruit pulp, greatly facilitating rupture and separation of the skin.

Furthermore, the vacuum to which the fruit may be subjected has a lower limit imposed in practice by the short time available. The object of the present invention is to provide and protect an improved vacuum peeling process and machine, in which the aforementioned disadvantages are obviated in a machine of rational, simple and economical construction.

This object is attained according to the invention in that the scalded tomatoes are instantaneously subjected to a pressure not exceeding 150 mm Hg absolute, and then, after momentary presence at a pressure of less than or at most equal to 150–170 mm Hg absolutely, the pressure is lowered as rapidly as possible to approximately 25–40 mm Hg absolute.

The machine according to the invention therefore differs from known machines in that the vacuum is provided in the trays containing the fruit in two distinct successive stages, as suggested by the process. The first stage consists of connecting the cap lying on the group of trays to a suitable vacuum vessel of dimensions comparatively much larger than the tray dimensions, so as to put said trays under vacuum, the pressure (vacuum) in said vessel being maintained at a constant value not exceeding 150–170 mm Hg absolute by suitable means. Between said means and said vacuum vessel there is connected a convenient condenser-dehumidifier which prevents the partial pressure of the ever present water vapour from decreasing the desired degree of vacuum.

Then with the trays still under vacuum, the pressure is made to repeatedly fluctuate downwards by directly connecting the said trays to the vacuum pumps.

In this manner, the fruit, already under vacuum, undergoes an instantaneous vacuum shock which induces alternating pulsations in the fruit so that its skin is completely torn and is partially separated.

The degree of vacuum attained at the end of this cycle exceeds the maximum vacuum obtainable in known machines by a large amount.

A known machine in accordance with these principles enables all variations of tomatoes of any degree of ripening and of any shape to be vacuum peeled.

After the pressure shock, the cap is connected to atmosphere to break the vacuum, while the fruit follows its continuous path, to discharge at the end of the machine into a usual skin separation machine.

The constructional and operational merits of the invention will be more evident from the detailed description given hereinafter by way of non-limiting example of one embodiment shown in the figures of the accompanying drawings, in which:

FIG. 1 is an outer side view of the device according to the invention;

FIG. 2 is an enlarged section of the line II—II of FIG. 1.

The said figures show a frame 1 which at its ends supports two pairs of substantially coplanar sprocket wheels 2 and 3 of equal diameter, between which are mounted two chains, which are not shown on the figure for reasons of clarity.

Said chains are supported between the two sprocket wheels of any one pair by convenient straight guides, and support a plurality of trays 4 disposed across the chains and substantially in the form of a truncated trapezoidal prism with an elongated rectangular base. Said trays 4 are positioned in such a manner that when they lie on the straight portions of the chains, their major edges rest one against the other.

At the front of the machine the frame 1 supports an electric motor 5 connected to a normal reducer 6 from which two power take-offs 7 and 8 branch.

The power take-off 7 rotates the pair of sprocket wheels 2 via the chain drive 9, and these drive the chains supporting the trays 4. The second power take-off 8 rotates the shaft 11 by way of the coupling 10, this shaft comprising two oppositely handed helical grooves 12.

The shaft 11 is supported by two suitable bushes 13 connected to convenient appendices 14 branching from the frame 1, and although said bushes 13 allow the shaft 11 to rotate, they prevent it from sliding axially.

The appendices 14 also support, above the shaft 11, a cylindrical guide 15 on which sleeves 16 branching from a mobile frame 17 may slide by way of suitable bearings.

Said frame 17 is supported both by the cylindrical guide 15 and by a rail fixed to the frame 1 in a position opposite the guide 15. A third sleeve 18 branches from one of the sleeves 16, and contains an inner projection which seats in the grooves 12 of the shaft 11. The rotary motion of the shaft 11 is therefore transformed into straight-line reciprocating motion of the frame 17.

Two suitable limit springs 19 wound on the cylindrical guide 15 facilitate passage of the projection in the sleeve 18 from one groove 12 to the other.

By means of a suitable cylinder-piston unit 20, the frame 17 supports a cap 21 which is guided during vertical movement by two cylindrical appendices 22 branching therefrom and seated in seats provided on the frame 17.

Said cap 21 is open upperly and is of such a size as to cover two or more trays 4.

The stroke of the cap 21 is substantially equal to one half the longitudinal dimension defined by the trays 4 covered thereby. Internally, said cap 21 contains suitable cross members which, together with the perimetral cap edges, support gaskets which form a pneumatic seal when the cap 21 rests on the edges of the underlying trays 4.

A flexible pipe 23 connects the cap 21 to the suction unit via a suitable valve 24, only when the cap 21 is lowered on to the trays 4.

The suction unit consists substantially of two normal vacuum pumps 25 in parallel, supported by the frame 1.

Two suction pipes 26 branch from said pumps 25 and are connected to the collector 27 and regulated by valves 28.

The pipe 27 is connected upperly to the pipe 29 which is connected via the valve 30 to the conduit 31, itself connected to a vacuum vessel 32 supported by a frame 1.

The conduit 29 is connected to a condenser-dehumidifier 33 from which a conduit 34 branches in a position opposite the conduit 29, and is connected via the valve 24 to the flexible pipe 23 connected to the cap 21.

At the rear of the machine there is disposed a chute 35 which supports a suitable hopper 36 located below the trays 4.

At its front, the frame 1 upperly supports a transverse cylindrical brush 37 lying above the trays 4, its purpose being to clean the edge in order to improve the seal with the cap 21.

At the front of the machine there is provided a normal scalder 38 from which there branches a loading hopper 39 extending to a position above the trays 4.

The operation of the machine is as follows. From the scalder 38, the fruit are loaded via the hopper 39 into the trays 4 rigid with the chains, which are driven by the pair of sprocket wheels 2, these latter deriving their motion from the reducer 6 via the chain 9 engaged with the power take-off 7.

The cylindrical brush 37 keeps the edge of the trays 4 clean and removes scum.

When the first three filled trays 4 arrive under the cap 21, this latter is lowered by the cylinder-piston unit 20 to rest on the edges of the underlying trays 4.

At this point the frame 17 supporting the cap 21 moves from right to left at the same speed as the trays 4 because of the engagement of the inner projection in the sleeve 18 with the groove 12 provided on the rotating shaft 11.

As the cap 21 rests on a group of trays 4, the valve 24 is opened to connect the cap 21 to the vacuum vessel 32.

The air arriving from the cap 21 via the flexible pipe 23 passes through the valve 24 and is fed into the condenser-dehumidifier 33, from which it passes through the pipe 31 into the vessel 32. Immediately afterwards, the valve 30 is closed to connect the cap 21 to the vacuum pumps 25, which instantaneously provide a greater degree of vacuum.

The repeated closure of the valve 30 causes pressure pulsation due to inertial phenomena, which induce rupture of the tomato skin. When the cap 21 reaches the end of its working stroke, the valve 24 is closed and the valve 30 reopened, to again connect the pumps 25 to the vessel 32 through the condenser 33.

At the same time, the cap 21 is connected to atmosphere to break the vacuum, the cylinder-piston unit 20 moves it upwards and the frame 17 begins its return stroke due to the fact that, because of the action of the limit spring 19, the inner projection on the sleeve 18 seats in the second groove 12 provided on the rotating shaft 11.

From the description it is apparent that the working stroke of the cap 21 is equal to half the longitudinal dimension defined by a group of trays 4 so that, on termination of the return stroke, said cap 21 lies above the next group of trays 4.

The described cycle of operations is repeated for said group and for the subsequent groups as they arrive under the cap 21 at the beginning of the working stage thereof.

The trays 4, moving continuously, reach the end of the machine where they turn over, to discharge the fruit onto the chute 35 connected to the skin separation machine.

During the return stage, the overturned trays 4 discharge the skins and water contained therein into the hopper 36.

The invention is not limited to the single embodiment heretofore described, and modifications and improvements may be made thereto without leaving the scope of the invention, the fundamental characteristics of which are summarised in the following claims.

What we claim is:

1. A process for peeling tomatoes comprising the steps of
    scalding said tomatoes to at least partially cook the skins of the tomatoes;
    subjecting the scalded tomatoes to a first absolute pressure not exceeding 150 mm Hg by rapidly drawing a vacuum on the tomatoes;
    maintaining said first absolute pressure at least momentarily;
    further lowering the absolute pressure acting on the tomatoes from said first absolute pressure, to a second absolute pressure in the range of 25–40 mm Hg by further drawing a vacuum on the tomatoes;
    then breaking said further vacuum; and
    then separating the skins from the tomatoes;
    and wherein said process further comprises,
    causing the absolute pressure acting on the tomatoes to fluctuate downwardly between said first and second pressures.

2. A process according to claim 1 wherein, said step of breaking said further vacuum comprises breaking said further vacuum immediately after attaining said second pressure.

* * * * *